US009825736B2

(12) United States Patent
Ran et al.

(10) Patent No.: US 9,825,736 B2
(45) Date of Patent: Nov. 21, 2017

(54) TRANSMITTER NOISE IN SYSTEM BUDGET

(71) Applicant: Intel Corporation, Santa Clara, CA (US)

(72) Inventors: Adee O. Ran, Maayan Baruch (IL); Kent C. Lusted, Aloha, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/949,036

(22) Filed: Nov. 23, 2015

(65) Prior Publication Data

US 2016/0149675 A1 May 26, 2016

Related U.S. Application Data

(63) Continuation of application No. 14/142,308, filed on Dec. 27, 2013, now Pat. No. 9,231,740.

(60) Provisional application No. 61/845,698, filed on Jul. 12, 2013.

(51) Int. Cl.
*H04L 1/20* (2006.01)
*H04L 1/24* (2006.01)

(52) U.S. Cl.
CPC .............. *H04L 1/248* (2013.01); *H04L 1/203* (2013.01); *H04L 1/244* (2013.01)

(58) Field of Classification Search
CPC .......... H04L 1/248; H04L 1/203; H04L 1/244
See application file for complete search history.

(56) References Cited

U.S. PATENT DOCUMENTS

| 5,010,405 | A | 4/1991 | Schreiber et al. |
| 5,668,927 | A | 9/1997 | Chan et al. |
| 6,032,114 | A | 2/2000 | Chan |
| 8,711,907 | B2 * | 4/2014 | Zhu ........................ H04B 7/063 370/334 |
| 8,817,908 | B2 * | 8/2014 | Lusted ................ H04L 25/4917 341/58 |
| 2002/0196178 | A1 | 12/2002 | Beard |
| 2005/0180520 | A1 | 8/2005 | Kim et al. |
| 2005/0259772 | A1 | 11/2005 | Voutilainen |
| 2008/0056403 | A1 | 3/2008 | Wilson |
| 2009/0207897 | A1 * | 8/2009 | Yamaguchi .......... H04B 17/336 375/226 |

(Continued)

FOREIGN PATENT DOCUMENTS

WO       2013158587 A1    10/2013

OTHER PUBLICATIONS

International Search Report received for PCT Patent Application No. PCT/US2013/036692 dated Aug. 23, 2013, 2 pages.

(Continued)

*Primary Examiner* — Jaison Joseph
(74) *Attorney, Agent, or Firm* — Grossman, Tucker, Perreault & Pfleger, PLLC

(57) ABSTRACT

One embodiment provides an apparatus. The example apparatus includes a root mean square (RMS) distortion determination module configured to determine an RMS distortion error and a signal to noise and distortion ratio (SNDR), the RMS distortion error determined based, at least in part, on a portion of a transmitted pulse centered at or near a transmitted pulse maximum amplitude and the SNDR determined based, at least in part, on the RMS distortion error.

31 Claims, 4 Drawing Sheets

(56) References Cited

U.S. PATENT DOCUMENTS

| | | | |
|---|---|---|---|
| 2009/0209878 A1 | 8/2009 | Sanger | |
| 2009/0303067 A1 | 12/2009 | Sharp | |
| 2010/0135430 A1 | 6/2010 | Oh et al. | |
| 2011/0158108 A1* | 6/2011 | Chan | H04L 12/2697 370/250 |
| 2011/0305161 A1* | 12/2011 | Ekpenyong | H04L 1/0031 370/252 |
| 2011/0316726 A1 | 12/2011 | Hollis | |
| 2012/0051735 A1* | 3/2012 | Achkir | H04L 43/50 398/16 |
| 2012/0314685 A1* | 12/2012 | Chen | H04L 5/0057 370/329 |
| 2013/0044624 A1* | 2/2013 | Su | H04L 1/0026 370/252 |
| 2013/0279781 A1* | 10/2013 | Ding | G06T 15/00 382/131 |
| 2014/0044061 A1* | 2/2014 | Yue | H04W 72/042 370/329 |
| 2014/0153620 A1* | 6/2014 | Longo | H04L 25/4917 375/219 |
| 2014/0169429 A1* | 6/2014 | Ran | H04B 17/104 375/226 |
| 2014/0253750 A1* | 9/2014 | Kwan | G06K 9/38 348/222.1 |
| 2015/0003505 A1* | 1/2015 | Lusted | H04L 25/4917 375/224 |

OTHER PUBLICATIONS

IEEE Physical Medium Attachment (PMA) sublayer, Physical Medium Dependent (PMD) sublayer, and baseband medium, type 100GBASE-KP4, IEEE Standard 802.3bj-2014, Part 94, Sections 94.2 and 94.3, 2014, 46 pages.

Bliss, et al., "A Preliminary Proposal for PAM-4TX Specification", for IEEE 802.3 100Gbps over backplane and copper cable task force, Sep. 12, 2011, 7 pages.

Bliss, et al., "A Proposal for TX Specification w/ PAM-4", for IEEE 802.3 100 Gbps over backplane and copper cable study group, Sep. 2011, 16 pages.

Brown, et al., "100G backplane PAM4 PHY encoding (revised)", IEEE P802.3bj, Mar. 2012, 36 pages.

Brown, et al. "Amendment and Supplement to brown_01_0312", IEEE 802.3bj, Mar. 2012, 20 pages.

Chalupsky, David, "Unapproved Minutes", IEEE P802.3bj 100 Gb/s Backplane and Copper Cable Task Force, Plenary Meeting, Mar. 13-14, 2012, 11 pages.

IEEE, "Physical layer specification for 1000 Mb/s operation on four pairs of Category 5 or better balanced twisted pair cable (1000BASE-T)", IEEE Draft 802.3ab/D4.0, Jul. 17, 1998, 153 pages.

Office Action issued in U.S. Appl. No. 14/142,308, dated Mar. 27, 2015, 8 pages.

Notice of Allowance issued in U.S. Appl. No. 14/142,308, dated Sep. 2, 2015, 12 pages.

* cited by examiner

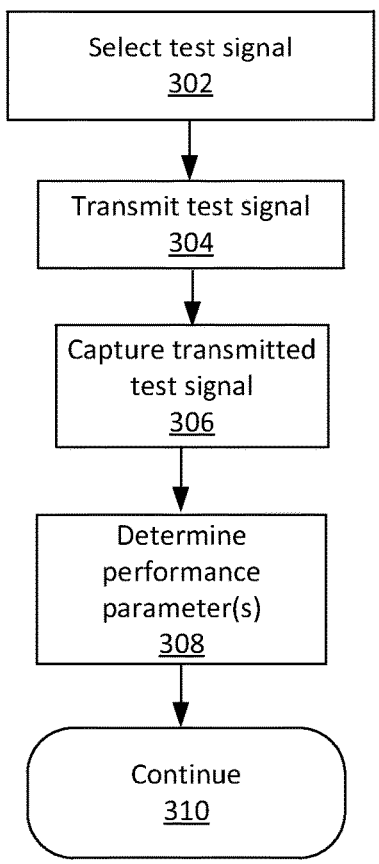
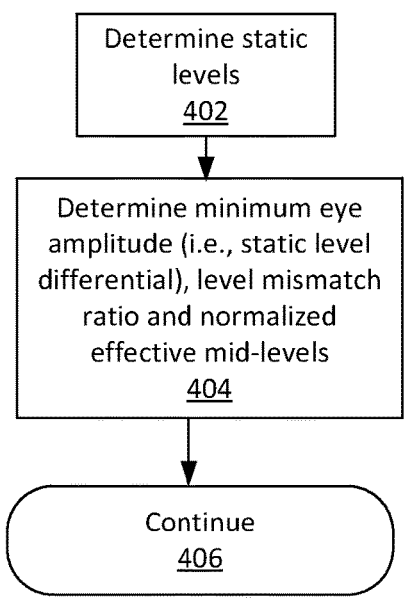
FIG. 3
FIG. 4

TRANSMITTER NOISE IN SYSTEM BUDGET

CROSS-REFERENCE TO RELATED APPLICATION(S)

This application is a U.S. Continuation Application of U.S. application Ser. No. 14/142,308 filed Dec. 27, 2013, and claims the benefit of U.S. Provisional Application No. 61/845,698 filed Jul. 12, 2013, both of which are incorporated herein by reference in their entirety.

FIELD

The present disclosure relates to transmitter noise, and, more particularly, to transmitter noise in a system budget.

BACKGROUND

A system budget in a communication system may specify allowable performance characteristics, e.g., jitter, noise, distortion, etc., for the communication system. The communication system typically includes a transmitting device, a communications link (that may include one or more channels) and a receiving device. A portion of the system budget is allocated to each component. Testing is typically performed on each component of the communication system individually to determine and/or confirm that the component operates within its respective portion of the system budget. In this testing, performance characteristics are assumed for upstream components when testing downstream components. For example, conventional channel testing typically assumes a transmitter with a specified jitter characteristic. Actual transmitter impairments may include jitter, noise and/or distortion. Thus, such testing may over-estimate or under-estimate actual transmitter performance characteristics when determining the system budget.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 3 is a flowchart of testing operations according to various embodiments of the present disclosure;

FIG. 4 is a flowchart of performance parameter determination operations according to various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to accounting for transmitter noise in a system budget. The methods and systems are configured to distribute the system budget between a transmitter, a communication channel and a receiver in a communication system. System budgets may specify transmitter performance parameters (e.g., including jitter, a signal to noise and distortion ratio (SNDR), a linear fit error and far-end noise), a channel operation margin (COM) that is related to the transmitter performance parameters and a receiver tolerance that is related to the transmitter performance parameters and the channel operating margin. For a transmitter, conventional specifications set a minimum SNDR that is measured across all phases of a pulse response unit interval (UI) and a linear fit error that is averaged across all phases of the pulse response UI. For the channel operating margin, conventional specifications include a parameter related to transmitter jitter. For a receiver, conventional specifications calibrate transmitter noise and then a target COM.

In an embodiment, methods and systems consistent with the present disclosure are configured to determine an SNDR based, at least in part on, a root mean square (RMS) distortion error and to determine the RMS distortion error over a portion of the pulse response UI that may be centered at or near a peak of the pulse. For a pulse amplitude modulated signal, with more than two levels, i.e., PAM-x, x>2, methods and systems consistent with the present disclosure are configured to determine static levels and to determine a linear fit and the SNDR based, at least in part, on the determined static levels. Methods and systems consistent with the present disclosure are configured to include a Gaussian, signal-dependent noise term representing transmitter noise in the determination of COM. For PAM-x (x>2) modulation, COM may be determined based, at least in part, on a signal degradation factor that is based, at least in part, on the determined static levels. Thus, the system budget may be generally more evenly allocated across system components and transmitter performance requirements may more accurately reflect actual transmitter performance characteristics.

Figure 1:
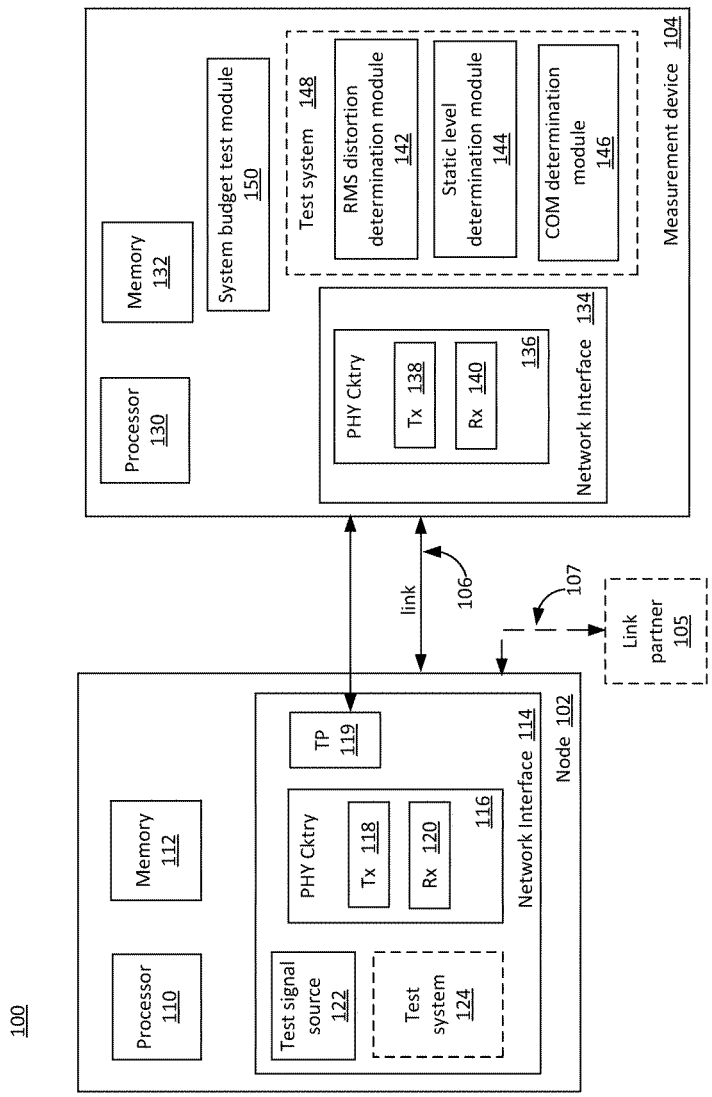
FIG. 1 illustrates a functional block diagram of a system consistent with various embodiments of the present disclosure.

FIG. 1 illustrates a functional block diagram of an example system 100 according to various embodiments of the present disclosure. The system 100 includes a node 102. System 100 may include a measurement device 104 and a communications link 106, e.g., during testing operations, as described herein. The system 100 may include a link partner 105 and a communications link 107, e.g., during normal operation. Measurement device 104 may be directly coupled to node 102 (e.g., for transmitter performance measurements) and/or may be coupled to node 102 via communication link 106 (e.g., for channel performance measurements).

The node 102 may be configured to communicate with link partner 105 and/or measurement device 104, via, e.g., a respective communication link 107, 106, using a switched fabric communications protocol, for example, an Ethernet communications protocol. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard for Ethernet, published 2012. The Ethernet protocol may comply or be compatible with the Ethernet standard published by the IEEE titled "IEEE P802.3bj™/D3.0 Draft Standard for Ethernet Amendment X: Physical Layer Specifications and Management Parameters for 100 Gb/s Operation Over Backplanes and Copper Cables", published Nov. 18, 2013, and/or earlier and/or later versions of this standard. Of course, in other embodiments, the switched fabric communications protocol may include a custom and/or proprietary switched fabric communications protocol.

"Node" may represent a computer node element (e.g., host server system, desktop computer, laptop computer, tablet computer, etc.), switch, router, hub, network storage device, network attached device, non-volatile memory (NVM) storage device, cloud-based server and/or storage system, a blade, a smartphone, etc. The node 102 includes a network interface 114 (e.g., network interface card, etc.), a system processor 110 (e.g., multi-core general purpose processor, such as those provided by Intel® Corp., etc.) and system memory 112. The measurement device 104 may include a processor 130, memory 132 and a network interface 134 similar to network interface 114.

The network interfaces 114, 134 include respective PHY circuitry 116, 136 generally configured to interface the node 102 with the measurement device 104. PHY circuitry 116 may be further configured to interface the node 102 with link partner 105 via a communications link, e.g., communications link 107. For example, node 102 may be coupled to link partner 105 during normal operation and may be coupled to measurement device 104 during testing, as described herein. PHY circuitry 116, 136 may comply or be compatible with, the aforementioned switched fabric communications protocols, which may include, for example, 10GBASE-KR, 40GBASE-KR4, 40GBASE-CR4, 100GBASE-CR10, 100GBASE-CR4, 100GBASE-KR4, and/or 100GBASE-KP4 and/or other PHY circuitry that is compliant with another and/or after-developed communications protocol.

PHY circuitry 116, 136 includes respective transmit circuitry (Tx) 118, 138 configured to transmit test signals from the node 102 to the measurement device 104 and commands and/or data, e.g., test parameters, from the measurement device 104 to the node 102, respectively. PHY circuitry 116, 136 further includes respective receive circuitry (Rx) 120, 140 configured to receive commands and/or data from the measurement device 104 and test signals from the node 102, respectively. Of course, PHY circuitry 116,136 may also include encoding/decoding circuitry and/or equalization circuitry (not shown) configured to perform analog-to-digital and digital-to-analog conversion, encoding and decoding of data, analog parasitic cancellation (for example, cross talk cancellation), equalization, and recovery of received data. The communications link 106 may comprise, for example, a media dependent interface that may include, for example, copper twin-axial cable, backplane traces on a printed circuit board, etc.

Transmit circuitry (Tx) 118 may be configured to transmit test signals, data packets and/or frames from the node 102 to the link partner 105, via communications link 107, and receive circuitry (Rx) 120 configured to receive data packets and/or frames from the link partner 105, via link 107. The communications link 107 may comprise, for example, a media dependent interface that may include, for example, copper twin-axial cable, backplane traces on a printed circuit board, etc. In some embodiments, the communications link 107 may include a plurality of logical and/or physical channels (e.g., differential pair channels) that provide separate connections between, for example, the Tx and Rx 118/120 of the node 102 and receive and transmit circuitry of the link partner 105. The link partner 105 may be configured to tolerate transmitter 118 performance characteristics, determined as described herein.

Measurement device 104 may include an RMS distortion module 142, a static level determination module 144 and a COM determination module 146. Modules 142, 144, 146 may be included in test system 148. Measurement device 104 may further include a system budget test module 150 configured to manage test system 148. Node 102 may include test signal source 122 that may be included in network interface 114. In some embodiments, node 102 may include test system 124 that may include one or more modules corresponding to modules 142, 144, 146.

Node 102 may be coupled to measurement device 104 in order to measure performance characteristics of node 102 and, in particular, Tx 118. In some embodiments, node 102 may include test point(s) TP 119 configured to couple, e.g., measurement device 104, to Tx 118 to facilitate measurements. In some embodiments, node 102 may be coupled to measurement device 104 by communications link 106.

Test signal source 122 is configured to generate and provide a selected test signal that may be utilized for a performance parameter measurement. The test signal may include one or more pulses that may be modulated. For example, the test signal may include a single pulse of duration one unit interval (UI). In this example, the single pulse may be utilized to determine a pulse response. In another example, the test signal may include a pulse stream modulated by a test bit sequence. Modulation may include pulse amplitude modulation (PAM), non-return to zero (NRZ), etc. PAM-x may include a number x levels (i.e., pulse amplitudes) where x>2. For example, PAM-4 corresponds to pulse amplitude modulation with four levels, thus a PAM-4 pulse may carry two bits of information. The test bit sequence may include a predefined bit sequence that is known by system budget test module 150. For example, the test bit sequence may correspond to a pseudo-random bit sequence (PRBS). In another example, the test bit sequence may include a test pattern. The test pattern may include a bit sequence that is repeated each interval of a plurality of intervals. The test pattern may be utilized to determine a plurality of static levels corresponding to a number of levels x for PAM-x.

Figure 2:
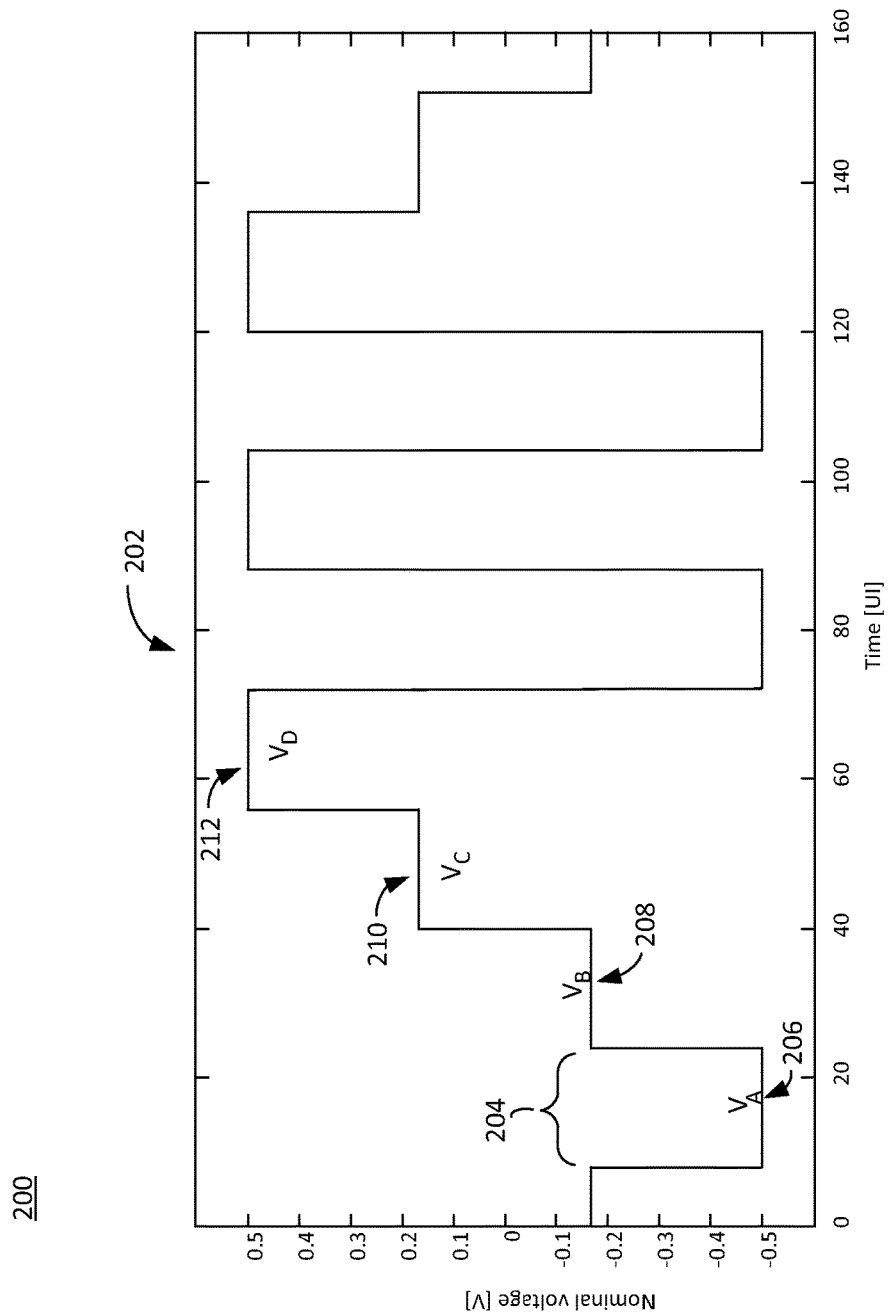
FIG. 2 illustrates a plot of an example test pattern that includes four static levels consistent with various embodiments of the present disclosure.

FIG. 2 illustrates a plot 200 of an example test pattern 202 that includes four static levels 206, 208, 210, 212. Test pattern 202 may be utilized as a test signal for PAM-4. In the plot 200, the horizontal axis corresponds to time and is measured in unit intervals (UIs) and the vertical axis corresponds to voltage (i.e., pulse amplitude). In the test pattern 202, the test signal is configured to dwell at each level 206, 208, 210, 212 for a time duration of level period 204. In this example, the level period duration 204 is 16 UIs. This level period duration 204 is configured to reduce effects of inter-symbol interference (ISI).

System budget test module 150 may be configured to select a test signal based, at least in part, on the performance parameter being evaluated and to provide a request to node 102. The Tx 118 is then configured to transmit the selected test signal. System budget test module 150 may then be configured to capture the transmitted test signal. For example, measurement device 104 may be coupled to TP 119. In another example, measurement device 104 may be coupled to node 102 via communication link 106.

Static level determination module 144 is configured to determine static levels based, at least in part, on the captured test signal. Static levels correspond to the voltages associated with each level of a PAM signal. The transmitted test signal may correspond to a test pattern, e.g., test pattern 202. Ideally, in pulse amplitude modulation, each level is equidistant from each adjacent level, i.e., uniform level spacing.

In other words, a voltage differential ("level differential") between adjacent levels is the same for each pair of adjacent levels. Such uniformity is configured to facilitate detection of each level. For example, for PAM-4 modulation with a normalized pulse amplitude between +1 and −1, the four levels may correspond to −1, −⅓, ⅓ and 1. In actuality, the level spacing may not be uniform and a size of the variation between level differentials is related to a transmitter performance characteristic.

Static level determination module 144 is configured to determine the transmitted amplitude of each level. For test pattern 202, the static levels 206, 208, 210, 212 are related to voltages $V_A$, $V_B$, $V_C$ and $V_D$, respectively. Voltages $V_A$, $V_B$, $V_C$ and $V_D$ may be measured at or near a center of each level period 204 of static levels 206, 208, 210, 212. For example, for a static level period duration of 16 UI, $V_A$, $V_B$, $V_C$ and $V_D$ may be measured over two UIs, e.g., from 7 UIs to 9 UIs for each level 206, 208, 210, 212. Of course, more or fewer static levels (i.e., x) may similarly be determined for PAM modulation with more or fewer static levels (i.e., PAM-x).

Static level determination module 144 may then be configured to determine a minimum eye amplitude (i.e., a minimum static level differential), a level mismatch ratio (i.e., a signal degradation factor), a DC offset and at least one normalized effective mid-level voltage. For example, for a PAM-4 test signal, static level determination module 144 may be configured to determine a minimum static level differential, $S_{min}$, as:

$$S_{min} = \frac{\min(V_D - V_C, V_C - V_B, V_B - V_A)}{2},$$

a level mismatch ratio, $R_{LM}$, as:

$$R_{LM} = \frac{6 * S_{min}}{V_D - V_A},$$

a DC offset, $V_{Avg}$, as:

$$V_{Avg} = \frac{V_A + V_B + V_C + V_D}{4},$$

and normalized effective mid-level voltages, $V_1$ and $V_2$ as:

$$V_1 = \frac{V_B - V_{Avg}}{V_A - V_{Avg}}; V_2 = \frac{V_C - V_{Avg}}{V_D - V_{Avg}}.$$

The factor six in the numerator of $R_{LM}$ is related to the number of level differentials in the transmitted signal, e.g., three for PAM-4. For example, there are six (i.e., 2*3) level differential halves in a peak-to-peak PAM-4 signal.

The minimum eye amplitude, $S_{min}$, and normalized mid-level voltages, $V_1$ and $V_2$, may be utilized by RMS distortion determination module 142 and/or COM determination module 146, as described herein. The level mismatch ratio, $R_{LM}$, corresponds to a signal degradation factor and is a transmitter performance characteristic that may be included in a figure of merit determination, as described herein. In an embodiment, $R_{LM}$ greater than or equal to 0.91 may be considered compliant. For example, a measured $R_{LM}$ equal to 0.92 may be considered compliant. In another example, a measured $R_{LM}$ equal to one may be considered compliant. $R_{LM}$ equal to one corresponds to no level mismatch, i.e., uniform static level differentials.

RMS distortion determination module 142 is configured to determine RMS distortion based, at least in part, on a captured test signal. The transmitted test signal may be a pattern configured to enable measurement and/or determination of a response to a single pulse of duration one unit interval (UI), i.e., a pulse response, and the RMS distortion module 142 may then be configured to determine the pulse response based, at least in part, on the captured test signal. The pulse response may include M samples (i.e., phases) per UI. RMS distortion determination module 142 may be configured to determine a linear fit (using, e.g., a linear regression) to the pulse response, p(k) where k =1, . . . ,M is the phase index. Linear fit may be utilized for noisy measurements to extract a linear part of a response from the noisy measurements when the transmitted bit sequence is known. The remainder (i.e., the part of the measurement that is not linear) may then be considered noise and may include measurement and/or transmitter noise. In conventional systems, the linear fit may be determined utilizing uniform static levels, e.g., −1, −⅓, ⅓ and 1 for PAM-4 modulation. Consistent with the present disclosure, linear fit may be determined utilizing normalized effective mid-levels (e.g., −1, −$V_1$, $V_2$, 1 for PAM-4) that may not be uniform. The normalized effective mid-levels (i.e., mid-level voltages) may be determined by static level determination module 144, as described herein. The standard deviation of the error between the measured pulse response and the linear fit to the measured pulse response may then be independent of level mismatch. In conventional systems, linear fit may be determined based, at least in part, on a plurality of measurements that are averaged prior to the linear fit determination. Linear fit, consistent with the present disclosure may be determined based, at least in part, on the pulse response (i.e., that has not been averaged).

RMS distortion determination module 142 may then be configured to determine a phase index, $k_p$, that corresponds to a maximum value of the pulse response, i.e., $k_p$=arg (max p(k)), k=1, . . . , M. RMS distortion determination module 142 may then be configured to determine, $\sigma_e(k)$, the standard deviation of the error between the measured pulse response and the linear fit to the measured pulse response. An RMS (root mean square) distortion error, i.e., a maximum standard deviation of the error between the measured pulse response and the linear fit to the measured pulse response, "max $\sigma_e(k)$", may then be determined by the RMS distortion determination module 142. In conventional systems, the RMS distortion error may be determined over a full pulse UI. An RMS distortion error, consistent with the present disclosure, may be determined over a portion of the pulse UI. The portion of the pulse UI may be centered at or near phase index $k_p$ corresponding to the maximum value of the pulse response p(k). In an embodiment, the portion of the pulse UI may correspond to one half of the pulse UI, e.g., $$k \in \left[k_p - \frac{M}{4}, k_p + \frac{M}{4}\right].$$

Determining RMS distortion error over a portion of the pulse UI may reduce effects of jitter in determining the RMS distortion error. The RMS distortion determination module 142 may then be configured to determine a signal to noise plus distortion ratio, SNDR, as:

$$SNDR = 20\log_{10}\frac{S_{min}}{\max\sigma_e(k)} \text{ for } k \in \left[k_P - \frac{M}{4}, k_P + \frac{M}{4}\right].$$

In conventional systems, a transmitter SNDR may be determined using a max $\sigma_e(k)$ determined over the full pulse width. For a node element consistent with the present disclosure, e.g., node 102, the SNDR may be determined over a portion of the pulse width, as described herein. For example, a node element with an SNDR greater than or equal to 22 dB may be considered conforming. In another example, a node element with an SNDR greater than or equal to 26 dB may be considered conforming. In another example, a node element with an SNDR greater than or equal to 27 dB may be considered conforming.

COM determination module 146 is configured to determine a channel operating margin as $20\log_{10}(A_S/A_{ni})$ where $A_S$ corresponds to a determined signal amplitude and $A_{ni}$ corresponds to a determined noise amplitude. COM, consistent with the present disclosure, may include $\sigma_{TX}$, a Gaussian, signal-dependent noise term that represents transmitter noise and, for a PAM-x transmitted signal with x>2, the signal degradation factor (i.e., ratio of level mismatch), $R_{LM}$. COM determination module 146 may be configured to determine $\sigma_{TX}$, corresponding to a standard deviation of transmitter noise as seen by a receiver, as:

$$\sigma_{TX} = \sigma_X * A_S \Big/ 10^{\frac{SNR_{TX}}{20}},$$

where $A_S$ and $\sigma_X$ represent signal level at the receiver and $SNR_{TX}$ is signal to noise level at the transmitter. In some embodiments, $SNR_{TX}$ may correspond to SNDR. COM may be related to a figure of merit (FOM) that may be determined as:

$$FOM = 10\log_{10}\left(\frac{(R_{LM}A_S)^2}{\sigma_{TX}^2 + \sigma_J^2 + \sigma_{ISI}^2 + \sigma_{XT}^2 + \sigma_N^2}\right).$$

The channel operating margin (COM) may then be similarly determined by replacing the denominator of the FOM equation with a noise amplitude (e.g., voltage), $A_{ni}$, that represents a noise and interference level as:

$$COM = 20\log_{10}\left(\frac{R_{LM}A_S}{A_{ni}}\right),$$

where $A_{ni}$ is a DER (detector error ratio) quantile (i.e., a signal level for which the probability of noise exceeding the signal level is as small as a specified DER). For example, DER corresponds to $10^{-5}$ for 100GBASE-CR4 and 100GBASE-KR4 physical layers and $3\times10^{-4}$ for the 100GBASE-KP4 physical layer. $A_{ni}$ may be calculated from a cumulative distribution function (CDF) of the noise and interference probability distribution, which is calculated using a statistical method from the channel parameters. The value of $\sigma_{TX}$ corresponds to the standard deviation of a Gaussian noise component that is mathematically convolved with the distributions of other noise components in the calculation of $A_{ni}$. $\sigma_{TX}$ is determined based, at least in part, on $SNR_{TX}$ that may correspond to SNDR, thus, $\sigma_{TX}$ may be based, at least in part, on SNDR.

Thus, transmitter performance measures may include SNDR that may be determined utilizing a portion of a pulse width and may include effects of static level mismatch. Transmitter performance measures (i.e., characteristics) may further include the signal degradation factor, $R_{LM}$, that is based, at least in part, on static level mismatch. COM may include the signal degradation factor $R_{LM}$ and at least one term related to transmitter noise. To successfully meet an associated performance measure, a receiver may thus be configured to tolerate an amount of static level mismatch and transmitter noise. A channel may then be configured to satisfy a COM target while including static level mismatch and transmitter noise. Thus, a relatively more accurate system budget allocation may be satisfied.

FIG. 3 is a flowchart 300 of testing operations according to various embodiments of the present disclosure. In particular, the flowchart 300 illustrates determining performance parameters based, at least in part, on a transmitted test signal. Operations of flowchart 300 may be performed, for example, by node 102 and/or measurement device 104. Operations of this embodiment include selecting a test signal 302. For example, the test signal may be selected from a plurality of possible test signals, including but not limited to, a single pulse and/or a bit stream modulated by a predefined bit sequence (i.e., a test pattern). Operation 304 includes transmitting the test signal. For example, the test signal may be generated and transmitted by node 102. The transmitted test signal may be captured at operation 306. For example, the test signal may be captured by measurement device 104. Performance parameter(s) may be determined at operation 308. For example, performance parameters may include SNDR, RMS distortion error, signal degradation factor (i.e., static level mismatch ratio) and/or COM. Program flow may continue at operation 310.

FIG. 4 is a flowchart 400 of performance parameter determination operations according to various embodiments of the present disclosure. In particular, the flowchart 400 illustrates operations configured to determine normalized effective mid-levels for a PAM-x (x>2) test signal. The operations of flowchart 400 may be performed by, e.g., static level determination module 144. Operations of this embodiment begin with determining static levels 402. For example, static levels may be determined based, at least in part, on a test pattern configured dwell at each of a plurality of static levels. Operations 404 may include determining a minimum eye amplitude (i.e., a static level differential), a level mismatch ratio and normalized effective mid-levels. Program flow may continue at operation 406.

Figure 5:
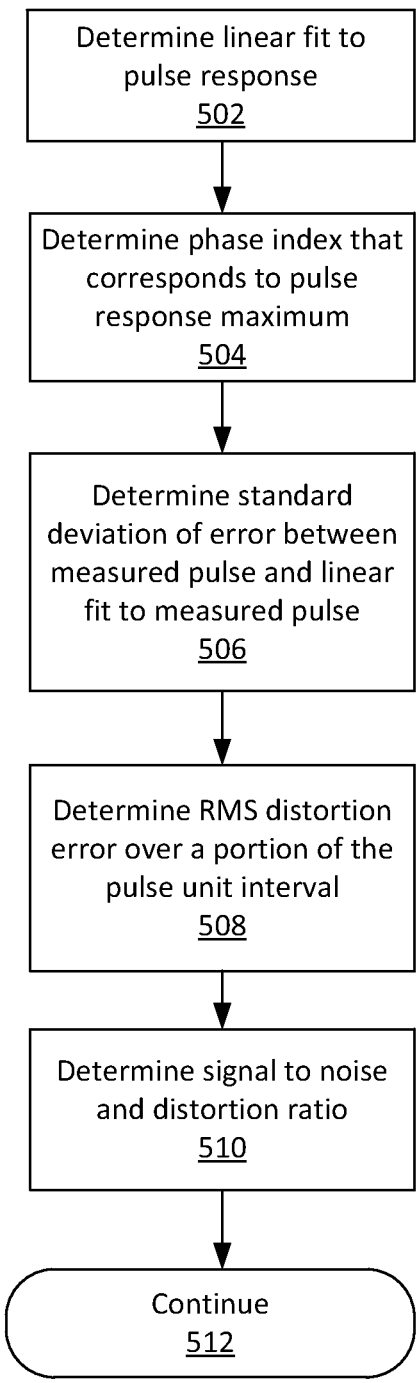
FIG. 5 is another flowchart of performance parameter determination operations according to various embodiments of the present disclosure.

FIG. 5 is a flowchart 500 of performance parameter determination operations according to various embodiments of the present disclosure. In particular, the flowchart 500 illustrates operations configured to determine a signal to noise and distortion ratio (SNDR). The operations of flowchart 500 may be performed by, e.g., RMS distortion determination module 142. Operations of this embodiment begin with determining a linear fit to a pulse response 502. For example, the linear fit may be determined based on a single pulse. Operations 504 may include determining a phase index that corresponds to a pulse response maximum. A standard deviation of the error between a measured pulse and a linear fit to the measured pulse may be determined at operation 506. An RMS (root mean square) distortion error over a portion of the pulse unit interval may be determined at operation 508. For example, the portion may be one-half and may be centered at or near the pulse response maximum. Operation 510 includes determining a signal to noise and distortion ratio. Program flow may continue at operation 512.

While the flowcharts of FIGS. 3, 4 and 5 illustrate operations according various embodiments, it is to be understood that not all of the operations depicted in FIGS. 3, 4 and/or 5 are necessary for other embodiments. In addition, it is fully contemplated herein that in other embodiments of the present disclosure, the operations depicted in FIGS. 3, 4 and/or 5, and/or other operations described herein may be combined in a manner not specifically shown in any of the drawings, and such embodiments may include less or more operations than are illustrated in FIGS. 3, 4 and/or 5. Thus, claims directed to features and/or operations that are not exactly shown in one drawing are deemed within the scope and content of the present disclosure.

The foregoing provides example system architectures and methodologies, however, modifications to the present disclosure are possible. For example, node 102 and/or measurement device 104 may also include chipset circuitry. Chipset circuitry may generally include "North Bridge" circuitry (not shown) to control communication between a processor, I/O circuitry and memory.

Node 102 and/or measurement device 104 may each further include an operating system (OS) to manage system resources and control tasks that are run on each respective device and/or system. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units.

The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated subsystem such as, for example, a TCP offload engine and/or I/O circuitry. The TCP offload engine circuitry may be configured to provide, for example, packet transport, packet segmentation, packet reassembly, error checking, transmission acknowledgements, transmission retries, etc., without the need for host CPU and/or software involvement.

Memory 112 and/or memory 132 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage devices having stored thereon, individually or in combination, instructions that when executed by one or more processors perform the methods. The processor may include, for example, a processing unit and/or programmable circuitry. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. "Module", as used herein, may comprise, singly or in any combination circuitry and/or code and/or instructions sets (e.g., software, firmware, etc.).

In some embodiments, a hardware description language may be used to specify circuit and/or logic implementation(s) for the various modules and/or circuitry described herein. For example, in one embodiment the hardware description language may comply or be compatible with a very high speed integrated circuits (VHSIC) hardware description language (VHDL) that may enable semiconductor fabrication of one or more circuits and/or modules described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, a system and method are configured to distribute the system budget between a transmitter, a communication channel and a receiver in a communication system. In an embodiment, methods and systems consistent with the present disclosure are configured to determine an SNDR based, at least in part on, a root mean square (RMS) distortion error and to determine the RMS distortion error over a portion of the pulse response UI that may centered at or near a peak of the pulse. Methods and systems consistent with the present disclosure are configured to determine static levels, a static level mismatch ratio, $R_{LM}$, (i.e., a signal degradation factor) and to determine a linear fit and the SNDR based, at least in part, on the determined static levels. Methods and systems consistent with the present disclosure are configured to include a Gaussian, signal-dependent noise term representing transmitter noise in determination of COM. For PAM-x modulation, COM may be determined based, at least in part, on the signal degradation factor that is based, at least in part, on the determined static levels. Thus, the system budget may be generally more evenly allocated across system components and transmitter performance requirements may more accurately reflect actual transmitter performance characteristics.

Accordingly, the present disclosure provides an example apparatus. The example apparatus includes a root mean square (RMS) distortion determination module configured to determine an RMS distortion error and a signal to noise and distortion ratio (SNDR), the RMS distortion error determined based, at least in part, on a portion of a transmitted pulse centered at or near a transmitted pulse maximum amplitude and the SNDR determined based, at least in part, on the RMS distortion error.

The present disclosure also provides an example system. The example system includes a measurement device comprising a system budget module configured to select a test signal; a computer node element comprising a transmitter configured to transmit the selected test signal; and a root mean square (RMS) distortion determination module configured to determine an RMS distortion error and a signal to noise and distortion ratio (SNDR), the RMS distortion error determined based, at least in part, on a portion of a transmitted pulse centered at or near a transmitted pulse maximum amplitude and the SNDR determined based, at least in part, on the RMS distortion error.

The present disclosure also provides an example method. The example method includes determining, by a root mean square (RMS) distortion determination module, an RMS distortion error based, at least in part, on a portion of a transmitted pulse centered at or near a transmitted pulse maximum amplitude; and determining, by the root mean square (RMS) distortion determination module, a signal to noise and distortion ratio (SNDR) based, at least in part, on the RMS distortion error.

The present disclosure also provides an example system that includes one or more storage devices having stored thereon, individually or in combination, instructions that when executed by one or more processors result in the following operations including: determining an RMS distortion error based, at least in part, on a portion of a transmitted pulse centered at or near a transmitted pulse maximum amplitude; and determining a signal to noise and distortion ratio (SNDR) based, at least in part, on the RMS distortion error.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system to determine transmitter noise, the system comprising:
   network interface circuitry; and
   measurement circuitry couple to the network interface circuitry, the measurement circuitry to:
   select at least one signal;
   transmit the selected at least one signal across the network interface circuitry;
   capture at least a portion of the transmitted at least one signal;
   determine at least one value indicative of a root-mean-square (RMS) distortion error present in the captured portion of the transmitted at least one signal; and
   determine at least one value indicative of a signal to noise and distortion ratio (SNDR) based, at least in part, on the determined at least one value indicative of the RMS distortion error.

2. The transmitter noise determination system of claim 1 wherein the at least one signal comprises at least one defined test signal.

3. The transmitter noise determination system of claim 2 wherein the at least one defined test signal includes at least one pulse.

4. The transmitter noise determination system of claim 3 wherein the at least one defined test signal includes at least a four-level pulse amplitude modulated (PAM-4) test signal.

5. The transmitter noise determination system of any of claim 3 or 4 wherein the measurement circuitry to determine at least one value indicative of an RMS distortion present in the captured portion of the transmitted at least one signal comprises:
   measurement circuitry to determine at least one value indicative of an RMS distortion present in the captured portion of the at least one pulse centered at about a maximum amplitude of the at least one pulse.

6. The transmitter noise determination system of claim 1, the measurement circuitry to further:
   determine at least one value representative of a minimum static level differential;
   determine at least one value representative of a level mismatch ratio; and
   determine at least one value representative of at least one normalized effective mid-level;
   wherein the at least one value indicative of the SNDR is based, at least in part on the at least one value representative of the minimum static level differential.

7. A transmitter noise measurement apparatus comprising:
   at least one measurement circuit coupleable to a network interface, the at least one measurement circuit to:
   select at least one test signal that includes a pulse amplitude modulated test signal that includes a plurality of pulse amplitudes (PAM-x);
   transmit the selected at least one signal across the network interface circuitry;
   capture at least a portion of the transmitted at least one signal;
   determine at least one value indicative of a root-mean-square (RMS) distortion error present in the captured portion of the transmitted at least one signal; and
   determine at least one value indicative of a signal to noise and distortion ratio (SNDR) based, at least in part, on the determined at least one value indicative of the RMS distortion error.

8. The transmitter noise measurement apparatus of claim 7 wherein the at least one measurement circuit to select at least one test signal that includes a pulse amplitude modulated test signal that includes a plurality of pulse amplitudes (PAM-x) comprises:
   at least one measurement circuit to select at least one test signal that includes a pulse amplitude modulated test signal that includes a plurality of pulse amplitudes (PAM-x) that produce a defined bit sequence.

9. The transmitter noise measurement apparatus of claim 7 wherein the at least one measurement circuit to select at least one test signal that includes a pulse amplitude modulated test signal that includes a plurality of pulse amplitudes (PAM-x) comprises:
   at least one measurement circuit to select at least one test signal that includes a pulse amplitude modulated test signal that includes a plurality of pulse amplitudes (PAM-x) that includes uniform level spacing in which each pulse amplitude is equidistant from each adjacent pulse amplitude.

10. The transmitter noise measurement apparatus of claim 7 wherein the at least one measurement circuit to select at least one test signal that includes a pulse amplitude modulated test signal that includes a plurality of pulse amplitudes (PAM-x) comprises:
    at least one measurement circuit to select at least one test signal that includes a pulse amplitude modulated test signal that includes a plurality of pulse amplitudes (PAM-x) that includes variable level spacing in which each pulse amplitude corresponds to at least one measurement circuit performance characteristic.

11. The transmitter noise measurement apparatus of claim 7, the at least one measurement circuit to further:
    determine at least one value indicative of a minimum eye amplitude ($S_{min}$);
    determine at least one value indicative of a level mismatch ratio;
    determine at least one value indicative of a direct current (DC) offset; and
    determine at least one value indicative of at least one normalized effective mid-level voltage.

12. A method to determine transmitter noise, the method comprising:
    selecting, by measurement circuitry, at least one signal;
    transmitting, by the measurement circuitry, the selected at least one signal across a communicably coupled network interface circuitry;
    capturing, by the measurement circuitry, at least a portion of the transmitted at least one signal;
    determining, by the measurement circuitry, at least one value indicative of a root-mean-square (RMS) distortion error present in the captured portion of the transmitted at least one signal; and
    determining, by the measurement circuitry, at least one value indicative of a signal to noise and distortion ratio (SNDR) based, at least in part, on the determined at least one value indicative of the RMS distortion error.

13. The transmitter noise determination method of claim 12 wherein selecting at least one signal comprises:
    selecting, by the measurement circuitry, at least one defined test signal.

14. The transmitter noise determination method of claim 13 wherein selecting at least one defined test signal comprises:
    selecting, by the measurement circuit, at least one defined test signal that includes at least one pulse.

15. The transmitter noise determination method of claim 14 wherein selecting at least one defined test signal that includes at least one pulse comprises:
    selecting, by the measurement circuit, at least one defined test signal that includes at least a four-level pulse amplitude modulated (PAM-4) test signal.

16. The transmitter noise determination method of any of claim 14 or 15 wherein determining at least one value indicative of an RMS distortion present in the captured portion of the transmitted at least one signal comprises:
    determining, by the measurement circuitry, at least one value indicative of an RMS distortion present in the captured portion of the at least one pulse centered at about a maximum amplitude of the at least one pulse.

17. The transmitter noise determination method of claim 12, further comprising:
    determining, by the measurement circuitry, at least one value representative of a level mismatch ratio;
    determining, by the measurement circuitry, at least one value representative of at least one normalized effective mid-level voltage; and
    determining, by the measurement circuitry, at least one value representative of a minimum static level differential, wherein the at least one value indicative of the SNDR is based, at least in part on the at least one value representative of the minimum static level differential.

18. A storage device that includes machine-readable instructions that, when executed by a measurement circuit, cause the measurement circuit to provide transmitter noise determination measurement circuitry that:
    selects at least one signal;
    causes a communicably coupled network interface to transmit the selected at least one signal;
    captures at least a portion of the transmitted at least one signal;
    determines at least one value indicative of a root-mean-square (RMS) distortion error present in the captured portion of the transmitted at least one signal; and
    determines at least one value indicative of a signal to noise and distortion ratio (SNDR) based, at least in part, on the determined at least one value indicative of the RMS distortion error.

19. The storage device of claim 18 wherein the machine-readable instructions that cause the transmitter noise determination measurement circuity to select at least one signal further cause the transmitter noise determination measurement circuity to:
    select at least one defined test signal.

20. The storage device of claim 19 wherein the machine-readable instructions that cause the transmitter noise determination measurement circuity to select at least one defined test signal further cause the transmitter noise determination measurement circuity to:
    select at least one defined test signal that includes at least one pulse.

21. The storage device of claim 20 wherein the machine-readable instructions that cause the transmitter noise determination measurement circuity to select at least one defined test signal that includes at least one pulse further cause the transmitter noise determination measurement circuity to:
    select at least one defined test signal that includes at least a four-level pulse amplitude modulated (PAM-4) test signal.

22. The storage device of any of claim 20 or 21 wherein the machine-readable instructions that cause the transmitter noise determination measurement circuity to determine at least one value indicative of an RMS distortion present in the captured portion of the transmitted at least one signal further cause the transmitter noise determination measurement circuity to:
    determine at least one value indicative of an RMS distortion present in the captured portion of the at least one pulse centered at about a maximum amplitude of the at least one pulse.

23. The storage device of claim 18 wherein the machine-readable instructions further cause the transmitter noise determination measurement circuity to:
    determine at least one value representative of a level mismatch ratio;
    determine at least one value representative of at least one normalized effective mid-level voltage; and
    determine at least one value representative of a minimum static level differential, wherein the at least one value indicative of the SNDR is based, at least in part on the determined at least one value representative at least one value representative of the minimum static level differential.

24. A transmitter noise determination system, comprising:
    at least one network interface; and
    at least one measurement circuit communicably coupled to the at least one network interface, the at least one measurement circuit to:
    select a test signal, the test signal including a pulse amplitude modulated test signal that includes at least four modulation levels;
    measure a pulse response based on the received test signal;
    determine a linear fit to the measured pulse response;
    determine a standard deviation of an error ($\sigma_e$) between the measured pulse response and the linear fit to the measured pulse response; and
    determine a signal-to-noise-and-distortion ratio (SNDR) that is base-10 logarithmically proportional to the inverse of the determined standard deviation of the error between a measured pulse response and the linear fit to the measured pulse response.

25. The system of claim 24 wherein the pulse amplitude modulated test signal consists of four different voltage amplitudes ($V_A$, $V_B$, $V_C$, $V_D$).

26. The system of claim 25 wherein the pulse amplitude modulated test signal consists of a repeated two-bit sequence.

27. The system of claim 25, further comprising a static determination module, the static determination module to determine a minimum static level differential according to the following:

$$S_{min} = \frac{\min(V_D - V_C, V_C - V_B, V_B - V_A)}{2}.$$

28. The system of claim 25, further comprising a static determination module, the static determination module to determine a DC offset according to the following:

$$V_{avg} = \frac{V_A + V_B + V_C + V_D}{4}.$$

29. The system of claim 28, further comprising a static determination module, the static determination module to determine a first normalized effective mid-level voltage according to the following:

$$V_1 = \frac{V_B - V_{avg}}{V_A - V_{avg}}.$$

30. The system of claim 28, further comprising a static determination module, the static determination module to determine a second normalized effective mid-level voltage according to the following:

$$V_2 = \frac{V_C - V_{avg}}{V_D - V_{avg}}.$$

31. The system of claim 29, further comprising a static determination module, the static determination module to determine a level mismatch ratio according to the following:

$$R_{LM} = \frac{6 * S_{min}}{V_D - V_A}.$$

* * * * *